United States Patent [19]

Fligner et al.

[11] Patent Number: 4,620,508

[45] Date of Patent: Nov. 4, 1986

[54] GAS DISCHARGE AND/OR DISTRIBUTION SYSTEM

[75] Inventors: Mark Fligner, Madison, N.J.; Edward C. Luckenbach, Cobham, England

[73] Assignee: Exxon Research and Engineering Company, Florham Park, N.J.

[21] Appl. No.: 779,842

[22] Filed: Sep. 25, 1985

[51] Int. Cl.[4] .............................................. F22D 1/00
[52] U.S. Cl. .................................. 122/7 R; 122/7 D; 431/5
[58] Field of Search .......... 122/7 R, 7 B, 7 D, 448 R, 122/448 A, 448 B; 431/4, 5, 89

[56] References Cited

U.S. PATENT DOCUMENTS 4,184,325  1/1980  Mandrin .............................. 122/7 R
4,355,601 10/1982  Hattiangadi ...................... 122/7 R X
4,557,686 12/1985  Laspisa ..................................... 431/5

Primary Examiner—Edward G. Favors
Attorney, Agent, or Firm—Edward H. Mazer

[57] ABSTRACT

The invention relates to a system for the discharge and/or distribution of a gas from a source of the gas, and more specifically relates to such a system which enables gas from a source to be discharged and/or distributed to at least two gas-utilizing units irrespective of the operational status of each unit. The gas from the source is conducted from a manifold to each unit via respective conduits. Each conduit has a valve having a maximum closed position, in which the valve is open to a predetermined minimum degree exceeding zero, and a maximum opened position, in which it is open to a predetermined extent set by the maximum gas capacity of the respective unit. One valve maintains a gas flow delivery pressure to its respective unit not exceeding a selected maximum pressure. The other valve maintains a gas flow-rate corresponding to the gas-requirement of its respective unit. Means are provided for on-stream diversion and discharge of gas passing to each unit to permit emergency independent shutdown of each unit. Accordingly, discharge of gas from the source can always take place irrespective of the operational status of the units to which the gas is distributed and without causing excessively high back-pressures at the source when the units are inoperative. In a specific embodiment, the source is the regenerator of a catalytic cracker, one unit is a CO-boiler and the other unit is a CO-furnace.

13 Claims, 2 Drawing Figures

GAS DISCHARGE AND/OR DISTRIBUTION SYSTEM

BACKGROUND OF THE INVENTION

The present invention relates to a system for the discharge and/or distribution of a gas, and more particularly (but not exclusively) to a system for the discharge and/or distribution of a gas selected from hot gas, combustible gas and hot combustible gas.

In many instances, particularly in industrial chemical works and petroleum refineries, hot and/or combustible gas are produced in quantities which vary from time to time, and for reasons of economy, it is desirable to employ the sensible heat and/or heat of combustion of such gases to heat process streams and/or to raise steam. However, such usage can cause certain problems, among which are the following:

(a) When the demand for heat is reduced or zero, the source of the hot and/or combustible gases can be throttled giving rise to problems elsewhere in the works or refinery.

(b) When the hot and/or combustible gas is used of reheating in more than one unit, a variation in the heat-demand by one unit can cause a major upset in the functioning of the other unit(s).

(c) When the hot and/or combustible gas is available in amounts in excess of the corresponding heat requirement, one or more units using the gas may malfunction.

The foregoing and other problems can all be accommodated to some extent by diverting the hot and/or combustible gas, and a number of schemes for diverting gas to deal with unprogrammed and unprogrammable variations in gas availability and demand are already known.

U.S. Pat. No. 2,734,526 describes a system in which a combustible gas is conducted from a source to a coke oven, and when the gas availability is in excess of the gas requirement at the coke oven (e.g. when the oven is inoperative), a diverting valve means operates to divert the gas to a flare stack where it is ignited. The diverting valve means comprises water seal means including two bell housings in a common chamber and having their lower edges normally below the level of water in respective seal housings. The bells are connected to each other by a link or chain, and when the gas flow to the oven is interrupted, the increase in gas pressure is communicated to the space beneath one of the bells which causes both bells to be raised. The raising of the other bell above its water seal provides communication between the source of gas and the flare stack and also activates a gas-ignition device to ignite the gas at the top of the flare stack.

U.S. Pat. No. 3,285,320 describes a system in which a fuel gas of variable hydrocarbon composition is burned in a process furnace to heat a fluid passing therethrough to a selected temperature. The heating value of the fuel gas is calculated from its density and the heating in the process furnace is regulated by monitoring the temperature of the heated fluid leaving the furnace, calculated therefrom the heat requirement of the furnace to sustain the selected temperature of the heated fluid, deriving from the gas density and correlated gas heating value the gas flow requirement for the heat requirement of the furnace, and varying the gas flow rate as necessary in order to provide the heat requirement of the furnace.

U.S. Pat. No. 3,749,546 describes a gas flare system adapted to burn waste combustible gas in widely varying quantities. The system comprises a manifold supplying a plurality of gas flare pipes connected in parallel to the manifold. One pipe is unvalved so that a flow path is always available for even the lowest flow rate of gas to the flare associated with this one pipe. The flow rate in the said one pipe is monitored and, at a predetermined rate, a valve which normally closes a second pipe is opened to permit gas to flow therethrough to a respective flare associated with the second pipe. Similarly, the flow in the second pipe is monitored, and when the gas rate therethrough attains a selected maximum rate, a normally-closed valve in a third pipe is opened thereby providing a path for gas to a third flare. This cascade of flow-responsive valves in the parallel-connected pipes enables gas to be safely burned in flares over a very wide range of gas rates.

U.S. Pat. No. 3,779,689 is similar to U.S. Pat. No. 3,749,546 but incorporates, in addition, a progressive cascade of steam supply to each flare supply pipe which is arranged to supply stream to one flare pipe before and after the monitored gas rate in another flare pipe is sustained at a rate at which the gas will continue to pass into the said one pipe in order to purge the latter and avoid the risk of explosion and to avoid the formation of smoke.

U.S. Pat. No. 3,852,019 describes a gas flare system for coping with widely-varying gas flow rates. The system comprises a manifold to which are connected a plurality of pipes of progressively smaller cross-sectional flow area. The largest such pipe is immersed deepest in a water seal and the smallest such pipe is immersed least deeply in the same water seal, the other pipe(s) being immersed to intermediate depths in accordance with their flow areas. Each pipe, with the exception of the largest, has a flow meter therein which regulates the rate at which steam is supplied to the flare at which the gas passing therethrough is burned. The gas flow out of the water seal is monitored and the steam supply rate to the flare regulated accordingly. Thus, even for the lowest gas flow rates (through the smallest, least-deeply immersed pipe), the steam rate to the flare will be roughly matched to the gas flow rate thereby mitigating or avoiding smoke formation.

U.S. Pat. No. 3,852,023 describes a gas flare system comprising a gas manifold connected to progressively narrower pipes. The pipes each have an open end beneath the surface of a discrete, respective water seal, and the wider pipes are immersed to greater depths than the narrower pipes so that at low gas flow rates, gas will pass from the manifold through the narrower pipes only and as the gas flow rate increases, gas will additionally flow through the wider pipes. The gas passing through each pipe and its water seal is conducted by a respective conduit to a respective region of an incinerator of progressively increasing width, the arrangement being that the low gas flows from the narrowest pipes are conducted to the narrowest part of the incinerator and higher gas flows from wider pipes are conducted to correspondingly wider parts of the incinerator. As a result, the gas is burned in the incinerator at a region appropriate to its flow rate, thereby effecting efficient combustion with low smoke and noise.

U.S. Pat. No. 4,095,934 describes a system for utilizing waste refinery gases. The system comprises a main manifold for receiving waste and vented combustible gases from refinery process units, a secondary manifold for conducting waste gas from the main manifold to a compressor and thence to various gas treating units and to a fuel gas utilization system, and a gas flare pipe for conducting the remaining waste gas to a flare for disposal. A control valve is located in the secondary manifold upstream of the compressor, and a first pressure sensor is disposed between the control valve and the compressor. When the pressure on the suction side of the compressor exceeds a selected level due to an increase in the gas flow rate into the secondary manifold, a signal is generated which closes the control valve to prevent overloading of the compressor and the fuel gas utilization system. A second pressure sensor is arranged to monitor the pressure in the gas flare pipe, and when the pressure falls to a selected low level, a signal is generated to cause the control valve to close. Thus the system enables the flare to be supplied with at least the minimum gas flow rate to maintain continuous gas combustion at the flare, and gas in excess of that flared is passed to the gas utilization system in an amount not exceeding the capacity of the gas utilization system. It will be appreciated that the system can operate so that no upper limit is imposed on the amount of gas passed to the flare and that the gas passed to the gas utilization system can be completely interrupted.

It is an object of the present invention to provide a system for the discharge and/or distribution of hot and/or combustible gas to at least two units which use the gas and to maintain the gas flow rate to said units within specified maximum and minimum limits.

SUMMARY OF THE INVENTION

The present invention provides a system for the substantially unrestricted discharge of a gas selected from hot gas, combustible gas and hot combustible gas from a source of said gas to at least two units of equipment which use the gas, the system comprising at least said two units, temperature-sensing means associated with one unit for generating a signal representative of the temperature of operation of at least part of said one unit, a first conduit for conveying hot and/or combustible gas to said one unit, a first valve means in said first conduit for regulating the gas-flow therethrough to said one unit, means responsive to a signal from the temperature-sensing means to control the position of the first valve means between its maximum open and maximum closed positions in accordance with variations in the said signal, a second conduit connected to the first conduit upstream of the first valve means, said second conduit being connected for conveying gas to a second unit, a second valve means in the second conduit, and means operative to maintain a selected set pressure in the second conduit at a position upstream of the second valve means to control the position of the second valve means between its maximum open and maximum closed positions in accordance with the pressure in the second conduit upstream of the second valve means, and wherein the maximum open position of each valve means permits a selected maximum flow-rate of gas to each respective unit substantially independently of the flow rate to the other unit(s) and the maximum closed position of the valve means permits the substantially unrestricted discharge of gas from the source via at least one valve means.

The said one unit may comprise means for heating a fluid by heat exchange with at least one gas selected from said hot gas, said hot combustible gas and hot combustion products obtained by combustion of said combustible gas, said temperature-sensing means being operative to generate a signal representative of the temperature of fluid heated in or by said heating means.

The said second unit may comprise means for producing steam by heat-exchange using the heat contained in the said gas and/or obtained by combustion thereof.

The system preferably comprises a vent or stack, a flip-flop valve means in the second conduit between the second valve means and the second unit and a third conduit providing communication from an outlet of the flip-flop valve and the vent or stack wherein the flip-flop valve normally closes the said outlet to the vent or stack so that gas passes to the second unit and is operable to divert gas to the vent or stack when no gas is required at said second unit.

The said source of gas may be the regenerator of a catalytic cracking unit.

In embodiments in which the heat requirements of the said one unit are known, whether they are constant or variable, the present invention provides a system for the substantially unrestricted discharge of a gas selected from hot gas, combustible gas and hot combustible gas from a source of said gas to at least two units of equipment which use the gas, the system comprising at least said two units, a first conduit for conveying hot and/or combustible gas to one unit, flow-rate means in the first conduit operative to generate a signal representative of the flow-rate of gas in the first conduit, heat-monitoring means operative to generate a signal representative of the heating capability of gas passing in the first conduit, a first valve means means in the first conduit for regulating the rate of gas-flow therethrough, regulating means responsive to signals from the flow-rate means and the heat-monitoring means to regulate the position of the first valve between its maximum open and maximum closed positions so that the heating capability of the gas passing through the first conduit is in accordance with the heat requirements of the said one unit, a second conduit connected to the first conduit upstream of the first valve means, said second conduit being connected for conveying gas to a second unit, a second valve means in the second conduit, and means responsive to pressure in the second conduit at a position upstream of the second valve means to open and close the second valve means between its maximum open and maximum closed positions in accordance with the pressure in the second conduit upstream of the second valve means, and wherein the maximum open position of each valve means permits a selected maximum flow-rate of gas to each respective unit substantially independently of the flow rate to the other unit(s) and the maximum closed position of the valve means permits the substantially unrestricted discharge of gas from the source via at least one valve means.

The said regulating means preferably take account of the heat requirement of the said one unit, by having them programmed either into the regulating unit or into a programmer associated with the regulating unit.

The invention also provides the combination comprising:
(a) a furnace adapted to burn carbon monoxide contained in a carbon monoxide-containing gas to heat a fluid which is passed through heat transfer means in the furnace;
(b) a boiler adapted to burn carbon monoxide contained in a CO-containing gas to generate steam;
(c) a main conduit for conducting a CO-containing gas from a source thereof to a junction;

(d) a first conduit for conducting CO-containing gas from the junction to the said furnace;

(e) a first control valve means in said first conduit between said junction and said furnace to regulate the flow of CO-containing gas to the furnace, said first control valve means having a maximum closed position in which a selected minimum flow (exceeding zero flow) of CO-containing gas can pass therethrough;

(f) temperature-responsive means responsive to the temperature of fluid which is passed through said heat-transfer means to regulate the opening and closing of said first control valve means so that the temperature of said fluid is maintained within a selected range;

(g) a second conduit for conducting CO-containing gas from the junction to the said boiler;

(h) a second control valve means in said second conduit between said junction and said boiler to regulate the flow of CO-containing gas to the boiler, said second control valve means having a maximum closed position in which a selected minimum flow (exceeding zero flow) of CO-containing gas can pass therethrough;

(i) means responsive to pressure in the second conduit upstream of the second control valve means and operative to regulate the opening and closing of the second control valve means; and (j) a liquid seal or other pressure-relief means connected to the first conduit between the first control valve means and the furnace; and wherein the combined minimum flow area for CO-containing gas through the first and second control valve means in their maximum closed positions is sufficient to enable CO-containing gas to pass through the main conduit at all times without substantial restriction to its flow.

The said combination preferably comprises a two-position diverting valve (e.g. a so-called "flip-flop" valve) in the second conduit between the second control valve and the boiler and which is operable to divert CO-containing gas from the second conduit to a vent or stack when no CO-containing gas is required at the boiler.

The combination may also comprise a fluidized catalytic cracking unit having a catalyst regenerator means, and a connecting conduit communicating at one end with the said main conduit and at the other end with said catalyst regenerator means to conduct CO-containing gas from said catalyst regenerator means to said main conduit.

The system and combination of the invention are now further described with reference to non-limitative embodiments thereof and with reference to the accompanying drawings.

The flow sheets show only those features which are necessary for an understanding of the invention. Those skilled in the art will appreciate that other items of equipment may be present but have not been depicted since the need for any such items will be readily known or apparent.

DETAILED DESCRIPTION OF THE DRAWINGS AND EMBODIMENTS

Figure 1:
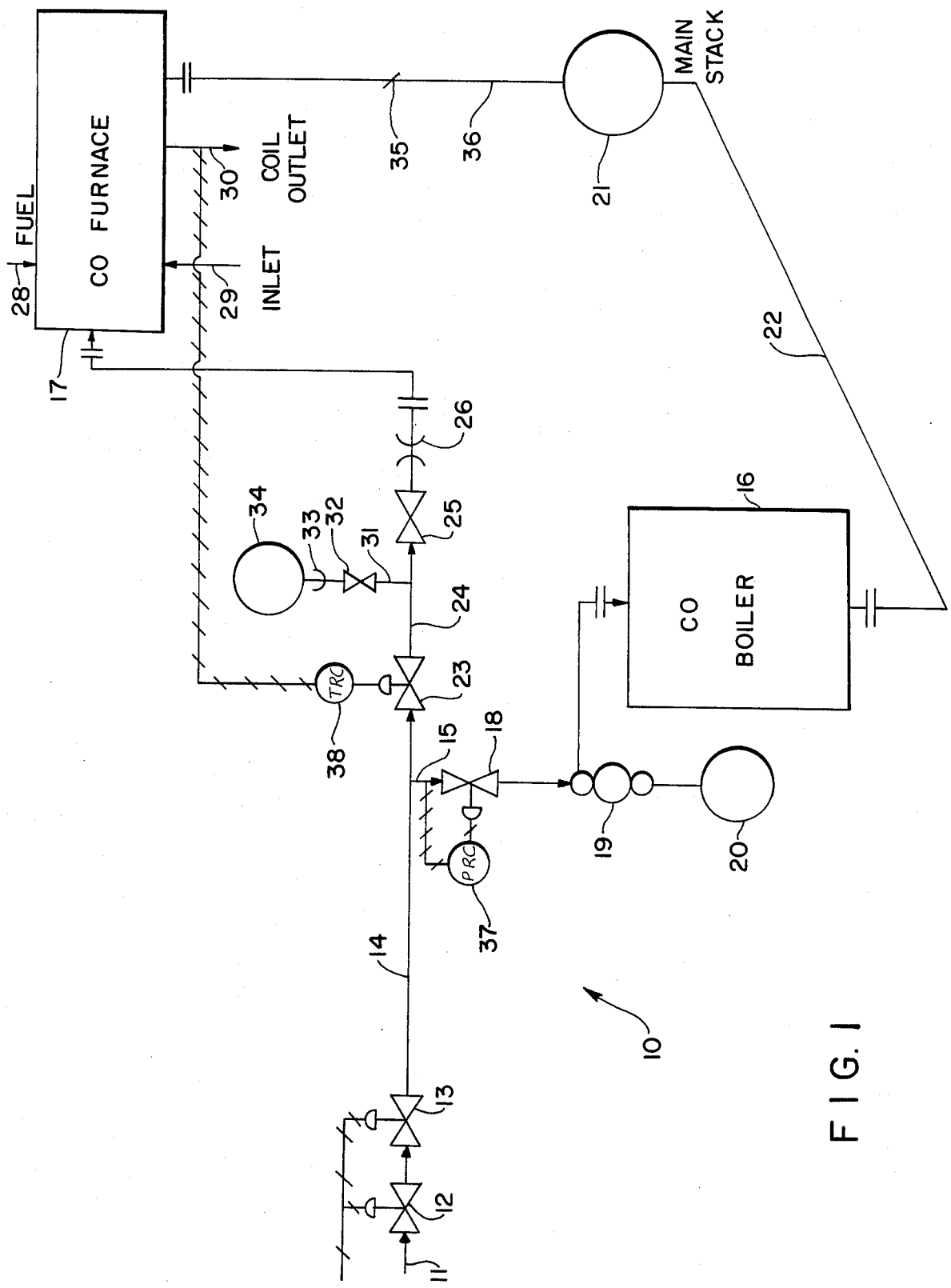
FIG. 1 is a chemical engineering flow sheet representation of one embodiment of the invention in which flue gas from the regenerator of a fluidized catalytic cracking unit is employed to provide heat in a boiler and a process fluid heating furnace.

In the system 10 shown in FIG. 1, flue gas from the regenerator of a fluidized catalytic cracking unit is conducted via conduit 11 and stack valves 12, 13 to a feed line 14 to which a branch line 15 is connected. The flue gas is at a temperature in the range of from about 590° C. to about 820° C., e.g. from about 650° C. to about 760° C., depending upon the type of regenerator and regeneration operation being performed. The flue gas contains up to about 13 volume percent of CO, e.g. from 2 to 6 volume percent CO, again depending upon the type of regenerator and regeneration operation. The foregoing figures for temperatures and CO volume percent are given for the purpose of illustration and are not limitative to this disclosure. A typical flue gas at a temperature of about 700° C. and with a CO content of about 4 volume percent can obviously be exploited for its sensible heat content in addition to the heat available by combustion of the CO. In the illustrated system 10, the flue gas is thus exploited in a CO-boiler 16 in which steam is raised and a CO-furnace 17 in which a process fluid, such as a hydrocarbon feedstock, is heated to a temperature suitable for the intended process.

The flue gas which is to be burned in the CO-furnace 17 passes via a second control valve 23 and a conduit 24 to a normally-open emergency shut-off valve 25, a normally-empty water seal 26 and into a conduit 27 which discharges the gas to the burners of the CO-furnace 17. The flue gas, together with any necessary supplementary fuel (such as fuel oil) supplied via fuel line 28, is burned with air or other combustion-supporting gas to provide heat in the furnace 17, and the heat is utilized to raise the temperature of a process fluid, such as a hydrocarbon feedstock, to a temperature suitable for the refining and/or conversion of the feedstock. The process fluid enters the furnace 17 via inlet line 29 and leaves via outlet line 30.

For occasions such as those involving repairs to the furnace 17 or emergencies, e.g. when the emergency shut-off valve 25 is closed, a by-pass pipe 31 is provided to conduct flue gas from conduit 24 via valve 32 and a water seal means 33 of conventional design to a by-pass stack 34. The valve 32 is normally open to a predetermined maximum value at which it provides substantially the same pressure drop characteristics for gas flow therethrough as the furnace 17, and water is provided in the water seal 33 to prevent the passage of unburned flue gas from conduit 24 to the stack 34 except when the pressure in conduit 24 exceeds a selected pressure indicative of an undesirably high resistance to gas flow. When the selected pressure in conduit 24 is exceeded, unburned flue gas overcomes the pressure of the head of water in the water seal 33 and is vented to the atmosphere via the stack 34 at a rate limited by the valve 32 thereby providing protection for the furnace 17 against excess gas pressure.

Burned flue gas and any other combustion products are discharged from the furnace 17 via trunking 36 to the stack 21. A damper 35 may be provided in trunking 36. Burned flue gas from the boiler 16 is discharged via trunking 22 to the stack 21.

Both the first control valve 18 and the second control valve 23 are of the type, or so constructed, that at their maximum closed positions, neither completely prevents gas flow therethrough and at their maximum opened positions, neither permits flow therethrough at a rate which exceeds the maximum allowable or desirable gas flow rate through the boiler 16 and the furnace 17 independently of each other. When both control valves 18 and 23 are in their maximum closed positions, the total flow area for gas therethrough is arranged to be sufficient to permit the relatively unobstructed flow therethrough of all the gases and vapors generated at the fluidized catalytic cracker during an emergency without significantly, or at all, throttling the cracker. Thus, the usual matrix of safety valves to discharge gases and vapors from the cracker during an emergency is not necessary and worthwhile cost savings are thereby realized. In addition, the maximum closed position of one or both of the valves 18 and 23 is preferably, but not essentially, set to ensure that the gas flow rate to one or both of the boiler 16 and the furnace 17 respectively does not fall below the minimum acceptable firing rate of the boiler 16 and/or the furnace 17.

The maximum closed and maximum open positions of the control valves 18 and 23 are defined by suitable stops which may be on the valves' opening and closing mechanisms, but which are more preferably on operative parts of the valves such as the valve closure member (e.g. the slide, gate or butterfly) or in the valve casing (e.g. on the valve seat and surrounding casing). The positions of the stops may be adjustable to permit on-stream regulation of the gas flow rates to the desired rates or to rates within the desired maxima and minima. The manner of construction of valves which are adapted so that they cannot fully close or open is well-known to those acquainted with valve technology and will therefore not be further elaborated herein.

The positions of the control valves 18 and 23 are both normally automatically controlled. The position of the first control valve 18 is controlled to establish a set and constant pressure in conduit 15 by a pressure recorder and controller, PRC 37. If the pressure in conduit 15 should rise, the increased pressure as monitored by PRC 37 causes the latter to generate a signal to cause the valve 18 to be opened or more fully opened to increase the gas flow through the valve 18 to the boiler 16. If the pressure in conduit should fall, the reduced pressure as monitored by PRC 37 results in the valve 18 being closed, or less fully opened, to maintain the pressure in the conduit 15, the gas flow to the boiler 16 being thereby reduced. Thus, the pressure in the header is maintained substantially constant and the supply rate of gas to the boiler 16 varies in this situation.

The position of the second control valve 23 is regulated in accordance with the heat demand of the furnace 17. The temperature of the heated process fluid leaving the furnace 17 via outlet line 30 is monitored by a temperature recorder and controller, TRC 38, which regulates the position of the second control valve 23. If the temperature of the heated process fluid in outlet line 30 is lower than a selected value, as monitored by TRC 38, a signal is generated to cause the control valve 23 to be opened so that the flow of gas to the furnace 17 is increased. On the other hand, if the temperature of the heated process fluid in outlet line 30 is excessive, the action of TRC 38 will be to cause the control valve 23 to be closed to reduce the gas supply rate to the furnace 17. The flow of gas to the furnace 17 is stabilized by the maintenance of a substantially constant upstream pressure in the feed line 14.

The valve positioning signals from the PRC 37 and the TRC 38 can be subjected to any one or more known modulations to take account of the nature of the boiler 16, furnace 17 and connecting conduits. Such modulation may involve differential, proportional or integral control or any combination of at least two of the foregoing modulations.

If the rate of gas flow in conduit 11 from the catalytic cracker exceeds the combined capacity of the boiler 16 and furnace 17, the resulting increase in pressure is limited by the water seal 33 which will permit the discharge of gas from conduit 24 to the stack 34 when a selected pressure is attained, thereby avoiding excessive gas flow rates to one or both of the boiler 16 and furnace 17 under all conditions of operation.

The illustrated system is adapted to permit the boiler 16 and furnace 17 to be shut down for repairs, inspections and other reasons independently of each other.

For shut-down of the boiler 16, the two-position diverting valve 19 is adjusted so that it obturates the flow-passage to boiler 16 and opens the flow-passage to stack 20.

For shut-down of the furnace 17, the emergency shut-off valve 25 can be closed and the water seal 26, which is normally dry, filled with water to provide a leakage-free seal so that line 27 can be closed off by a blanking-plate or so-called "blind". When the valve 25 is closed, the water seal 33 is preferably drained of water to permit the discharge of excess gas via the stack 34.

Figure 2:
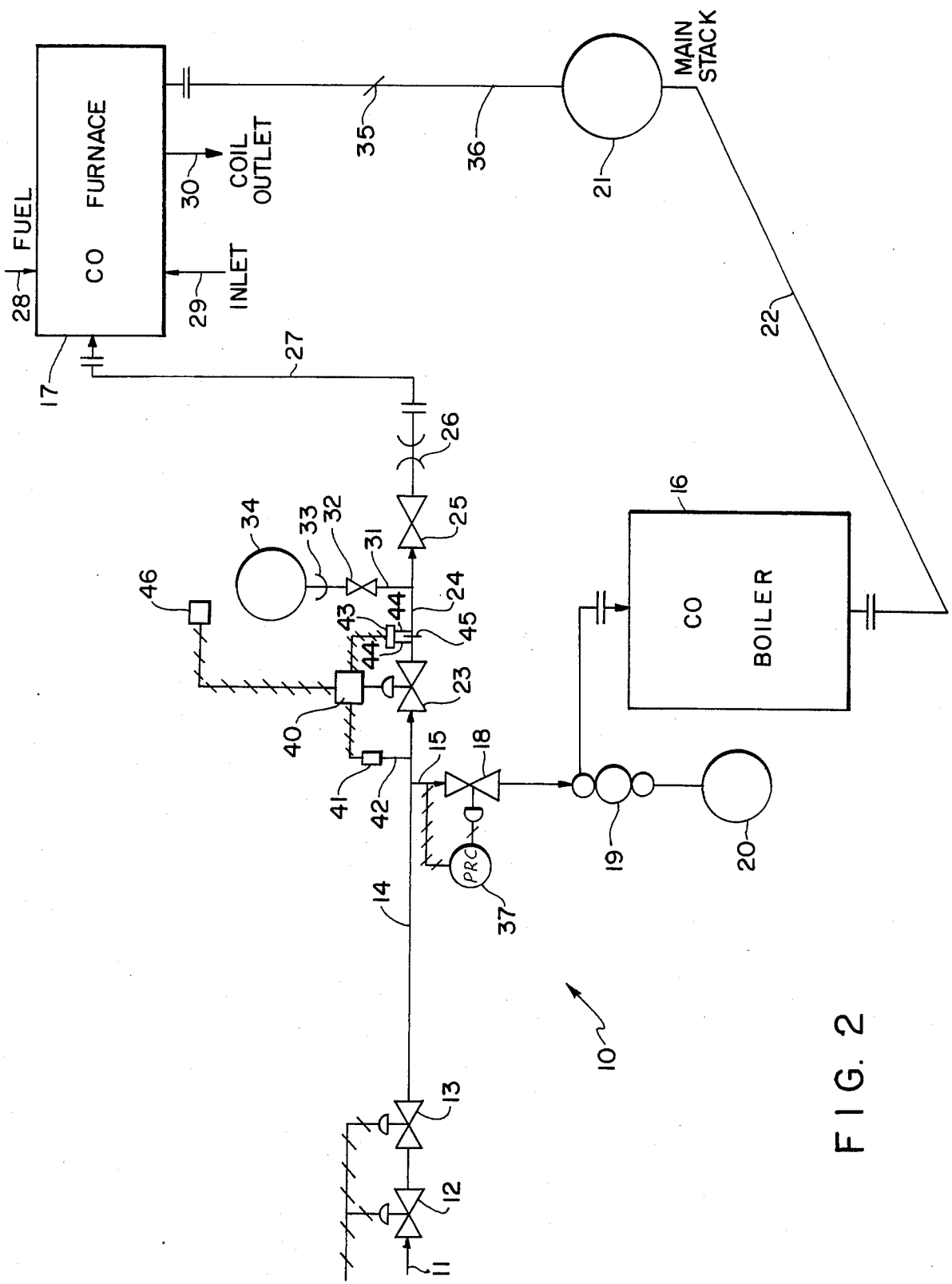
FIG. 2 is a chemical engineering flow sheet representation of another embodiment of the invention.

Reference is now made to the embodiment represented by FIG. 2. This embodiment is similar in virtually all respects to that represented in FIG. 1 except insofar as regulation of the control valve 23 is achieved. FIG. 2 represents an embodiment in which the heat requirement of the furnace 17 is known or predetermined, irrespective of whether the heat requirement is constant or variable.

The opening and closing of the valve 23 is regulated by a controller 40 which receives signals representative of the heating capability and flow-rate of the gas passing to the furnace 17 via conduit 24 and, if necessary, modulates the setting of the valve 23 so that the gas flow-rate therethrough to the furnace 17 is in accordance with the heat requirements of the furnace. The controller 40 preferably comprises a computer to calculate the heat available from the gas passing to the furnace 17 on the basis of its heating capability and its flow-rate.

Samples of gas are withdrawn from feed line 14 either continuously or intermittently into sampler 41 via sampling tube 42. The sampler 41 determines the heating capability (sensible heat plus heat available on combustion) of the gas samples, and a signal representative of the heating capability is relayed to the controller 40.

The flow-rate of gas in the conduit 24 is determined by a differential-pressure cell/transducer 43 which receives differential pressure signals from two sensing tubes 44 in respective upstream and downstream positions relative to a venturi or orifice plate 45.

The heat requirement of the furnace 17 may be constant or it may be variable. Preferably, the heat requirement of the furnace 17 is predetermined by a program in a data-bank 46 (or similar facility), and signals representative of the heat requirement during operation of the furnace are relayed either continuously or intermittently to the controller where they are compared with the heating capability of the gas as computed in the controller 40 from the signals obtained from the sampler 41 and the transducer 43. If the heat requirement of the furnace 17 exceeds the heating capability of the gas, the controller 40 generates a signal to cause the control valve to open until the heat requirement matches the heating capability. Similarly, if the heating requirement is lower than the heating capability, the controller 40 generates a signal to cause the control valve 23 to close until the heat requirement matches the heating capability of the gas being supplied to the furnace 17 via conduit 24.

All of the items of equipment described in relation to the embodiments represented in FIGS. 1 and 2 are commercially available and known to those skilled in the art.

The system of the present invention has the merit of being simple and of low cost, and as will be appreciated from the account given herein, provides numerous benefits and advantages, not hitherto available, among which are the following:
(a) the maximum and minimum gas flow rates to the gas-using facilities (i.e. the boiler 16 and the furnace 17) are defined and limited;
(b) at least one gas-using facility (e.g. the furnace 17) is protected against excessive pressure;
(c) provision is made for the on-stream diversion of flue gas to permit shut-down of each facility independently of the other;
(d) the source of the gas (e.g. a fluidized catalytic cracker) is protected against excessive pressure rise in the event of an emergency.

Other benefits and advantages will be apparent to those skilled in the art.

Although the system of the invention has been described, in the context of the drawings, with reference to the source of the gas in conduit 11 being a fluidized catalytic cracker, it is to be understood that the gas may be derived from other sources, e.g. a delayed coker, a steam reforming or steam cracking plant or a gas turbine, inter alia.

Moreover, one or more of the water seals may be substituted by any other suitable type of pressure relief device without departing from the invention.

What is claimed is:

1. A system for the substantially unrestricted discharge of a gas selected from hot gas, combustible gas and hot combustible gas from a source of said gas to at least two units of equipment which use the gas, the system comprising at least said two units, temperature-sensing means associated with one unit for generating a signal representative of the temperature of operation of at least part of said one unit, a first conduit for conveying hot and/or combustible gas to said one unit, a first valve means in said first conduit for regulating the gas-flow therethrough to said one unit, means responsive to a signal from the temperature-sensing means to control the position of the first valve means between its maximum open and maximum closed positions in accordance with variations in the said signal, a second conduit connected to the first conduit upstream of the first valve means, said second conduit being connected for conveying gas to a second unit, a second valve means in the second conduit, and means operative to maintain a selected set pressure in the second conduit at a position upstream of the second valve means to control the position of the second valve means between its maximum open and maximum closed positions in accordance with the pressure in the second conduit upstream of the second valve means, and wherein the maximum open position of each valve means permits a selected maximum flow-rate of gas to each respective unit substantially independently of the flow rate to the other unit(s) and the maximum closed position of the valve means permits the substantially unrestricted discharge of gas from the source via at least one valve means.

2. A system as in claim 1 in which all of the said valve means do not completely obstruct gas flow therethrough when in the maximum closed position.

3. A system as in claim 1 comprising a pressure relief means between the said one valve means and the said one unit to prevent said one unit receiving gas at a pressure above a selected maximum pressure.

4. A system as in claim 3 in which the pressure relief means comprises a liquid seal (e.g., a water seal in a U-tube means).

5. A system as in claim 1 in which said one unit comprises means for heating a fluid by heat exchange with at least one gas selected from said hot gas, said hot combustible gas and hot combustion products obtained by combustion of said combustible gas, said temperature-sensing means being operative to generate a signal representative of the temperature of fluid heated in or by said heating means.

6. A system as in claim 1 in which the said second unit comprises means for producing steam by heat-exchange using the heat contained in the said gas and/or obtained by combustion thereof.

7. A system as in claim 1 comprising a vent or stack, a flip-flop valve means in the second conduit between the second valve means and the second unit and a third conduit providing communication from an outlet of the flip-flp valve and the vent or stack wherein the flip-flop valve normally closes the said outlet to the vent or stack so that gas passes to the second unit and is operable to divert gas to the vent or stack when no gas is required at said second unit.

8. A system as in claim 1 in which said source of gas is the regenerator of a catalytic cracking unit.

9. The combination comprising:
(a) a furnace adapted to burn carbon monoxide contained in a carbon monoxide-containing gas to heat a fluid which is passed through heat transfer means in the furnace;
(b) a boiler adapted to burn carbon monoxide contained in a CO-containing gas to generate steam;
(c) a main conduit for conducting a CO-containing gas from a source thereof to a junction;
(d) a first conduit for conducting CO-containing gas from the junction to the said furnace;
(e) a first control valve means in said first conduit between said junction and said furnace to regulate the flow of CO-containing gas to the furnace, said first control valve means having a maximum closed position in which a selected minimum flow (exceeding zero flow) of CO-containing gas can pass therethrough;
(f) temperature-responsive means responsive to the temperature of fluid which is passed through said heat-transfer means to regulate the opening and closing of said first control valve means so that the temperature of said fluid is maintained within a selected range;
(g) a second conduit for conducting CO-containing gas from the junction to the said boiler;
(h) a second control valve means in said second conduit between said junction and said boiler to regulate the flow of CO-containing gas to the boiler, said second control valve means having a maximum closed position in which a selected minimum flow, exceeding zero flow, of CO-containing gas can pass therethrough;

(i) means responsive to pressure in the second conduit upstream of the second control valve means and operative to regulate the opening and closing of the second control valve means; and (j) a liquid seal or other pressure-relief means connected to the first conduit between the first control valve means and the furnace; and wherein the combined minimum flow area for CO-containing gas through the first and second control valve means in their maximum closed positions is sufficient to enable CO-containing gas to pass through the main conduit at all times without substantial restriction to its flow.

10. The combination of claim 9 comprising a two-position diverting valve in the second conduit between the second control valve and the boiler and which is operable to divert CO-containing gas from the second conduit to a vent or stack when no CO-containing gas is required at the boiler.

11. The combination of claim 9 comprising a fluidized catalytic cracking unit having a catalyst regenerator means, and a connecting conduit communicating at one end with the said main conduit and at the other end with said catalyst regenerator means to conduct CO-containing gas from said catalyst regenerator means to said main conduit.

12. A system for the substantially unrestricted discharge of a gas selected from hot gas, combustible gas and hot combustible gas from a source of said gas to at least two units of equipment which use the gas, the system comprising at least said two units, a first conduit for conveying hot and/or combustible gas to one unit, flow-rate means in the first conduit operative to generate a signal representative of the flow-rate of gas in the first conduit, heat-monitoring means operative to generate a signal representative of the heating capability of gas passing in the first conduit, a first valve means means in the first conduit for regulating the rate of gas-flow therethrough, regulating means responsive to signals from the flow-rate means and the heat-monitoring means to regulate the position of the first valve means between its maximum open and maximum closed positions so that the heating capability of the gas passing through the first conduit is in accordance with the heat requirements of the said one unit, a second conduit connected to the first conduit upstream of the first valve means, said second conduit being connected for conveying gas to a second unit, a second valve means in the second conduit, and means responsive to pressure in the second conduit at a position upstream of the second valve means to open and close the second valve means between its maximum open and maximum closed positions in accordance with the pressure in the second conduit upstream of the second valve means, and wherein the maximum open position of each valve means permits a selected maximum flow-rate of gas to each respective unit substantially independently of the flow rate to the other unit(s) and the maximum closed position of the valve means permits the substantially unrestricted discharge of gas from the source via at least one valve means.

13. A system as in claim 12 in which all of the said valve means do not completely obstruct gas flow therethrough when in the maximum closed position.

* * * * *